United States Patent
Drepper

(10) Patent No.: US 11,928,447 B2
(45) Date of Patent: *Mar. 12, 2024

(54) CONFIGURATION MANAGEMENT THROUGH INFORMATION AND CODE INJECTION AT COMPILE TIME

(71) Applicant: Red Hat, Inc., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,909

(22) Filed: Jul. 26, 2021

(65) Prior Publication Data

US 2021/0349703 A1 Nov. 11, 2021

Related U.S. Application Data

(63) Continuation of application No. 16/553,364, filed on Aug. 28, 2019, now Pat. No. 11,080,029.

(51) Int. Cl.
*G06F 8/41* (2018.01)

(52) U.S. Cl.
CPC .................. *G06F 8/4435* (2013.01)

(58) Field of Classification Search
CPC ............................. G06F 8/443; G06F 8/4435
See application file for complete search history.

(56) References Cited

U.S. PATENT DOCUMENTS

| | | | |
|---|---|---|---|
| 7,543,284 B2 | 6/2009 | Bolton et al. | |
| 7,571,432 B2 | 8/2009 | Heishi et al. | |
| 9,134,973 B2 | 9/2015 | Schneider | |
| 9,378,000 B1 | 6/2016 | Lee | |
| 9,904,527 B1 | 2/2018 | Miller | |
| 2004/0117772 A1 | 6/2004 | Brand et al. | |
| 2008/0028373 A1 | 1/2008 | Yang et al. | |
| 2009/0119654 A1 | 5/2009 | Kawahito et al. | |
| 2011/0119660 A1 | 1/2011 | Tanaka | |
| 2016/0139895 A1* | 5/2016 | Stella | H04L 67/10 717/147 |
| 2017/0269907 A1* | 9/2017 | Goetz | G06F 8/30 |
| 2018/0136917 A1 | 5/2018 | Fujii | |

OTHER PUBLICATIONS

Colorado State Universtiy, "Program Optimizations using Data Flow Analysis", Apr. 22, 2015, 6 pages.
USPTO, Office Action for U.S. Appl. No. 16/553,364, dated Aug. 3, 2020.
USPTO, Final Office Action for U.S. Appl. No. 16/553,364, dated Dec. 3, 2020.
USPTO, Notice of Allowance for U.S. Appl. No. 16/553,364, dated Mar. 29, 2021.

\* cited by examiner

*Primary Examiner* — Duy Khuong T Nguyen
(74) *Attorney, Agent, or Firm* — Lowenstein Sandler LLP

(57) ABSTRACT

Systems and methods for configuration management through information and code injection at compile time. An example method comprises: receiving a source code comprising one or more references to a variable; receiving metadata associated with the source code, wherein the metadata specifies a range of values of the variable; and identifying, in view of the range of values of the variable, a reachable section of the source code.

20 Claims, 10 Drawing Sheets

```
300                                                     301 handle_message(stream s) {              303       handle_message(stream s) {
  msg = read(s)                                     msg = read(s)
  type = get_type(msg)                              type = get_type(msg)
#if HANDLE_TYPE1 || HANDLE_TYPE2  302     310     #pragma assume var(messagetype:type)
  if (type == TYPE1 || type == TYPE2) {             if (type == TYPE1 || type == TYPE2) {
    handle_types_1_and_2 ...    304                   handle_types_1_and_2 ...
  } else                                            } else
#endif
#if HANDLE_TYPE3        308
  if (type == TYPE3) {                              if (type == TYPE3) {
    handle_type_3 ...   312                           handle_type_3 ...
  } else                                            } else
#endif
  {                                                 {
    handle_other_types ...                            handle_other_types ...
  }                                                 }
}                                                 } compose_message(stream s, data d) {             compose_message(stream s, data d) {
  msg = getbuffer()                                 msg = getbuffer()
  type = get_type(d)                                type = get_type(d)
#if HANDLE_TYPE1 || HANDLE_TYPE4                  #pragma assume var(messagetype:type)
  if (type == TYPE1 || type == TYPE4) {             if (type == TYPE1 || type == TYPE4) {
    handle_types_1_and_4 ...                          handle_types_1_and_4 ...
  } else                                            } else
#endif                                    306
#if HANDLE_TYPE2
  if (type == TYPE2) {                              if (type == TYPE2) {
    handle_type_2 ...                                 handle_type_2 ...
  } else                                            } else
#endif
  {                                                 {
    handle_other_types ...                            handle_other_types ...
  }                                                 }
  write(s, type, msg)                               write(s, type, msg)
}                                                 }
```

FIG. 3A                                     FIG. 3B

CONFIGURATION MANAGEMENT THROUGH INFORMATION AND CODE INJECTION AT COMPILE TIME

RELATED APPLICATIONS

This application is a continuation of U.S. patent application Ser. No. 16/553,364 filed on Aug. 28, 2019, the entire content of which is incorporated by reference herein.

TECHNICAL FIELD

The present disclosure is generally related to code compilation, and more particularly, to configuration management through information and code injection at compile time.

BACKGROUND

Compilers are used to translate computer code written in one programming language (the source language) into another programming language (the target language). Typically compilers are used to translate source code from a high-level programming language to a lower level language (e.g., assembly language, object code, or machine code) in order to create an executable program.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3A depicts a diagram of an example block of code, in accordance with one or more aspects of the present disclosure;

FIG. 3B depicts a diagram of an example block of marked up code, in accordance with one or more aspects of the present disclosure;

DETAILED DESCRIPTION

Figure 1:
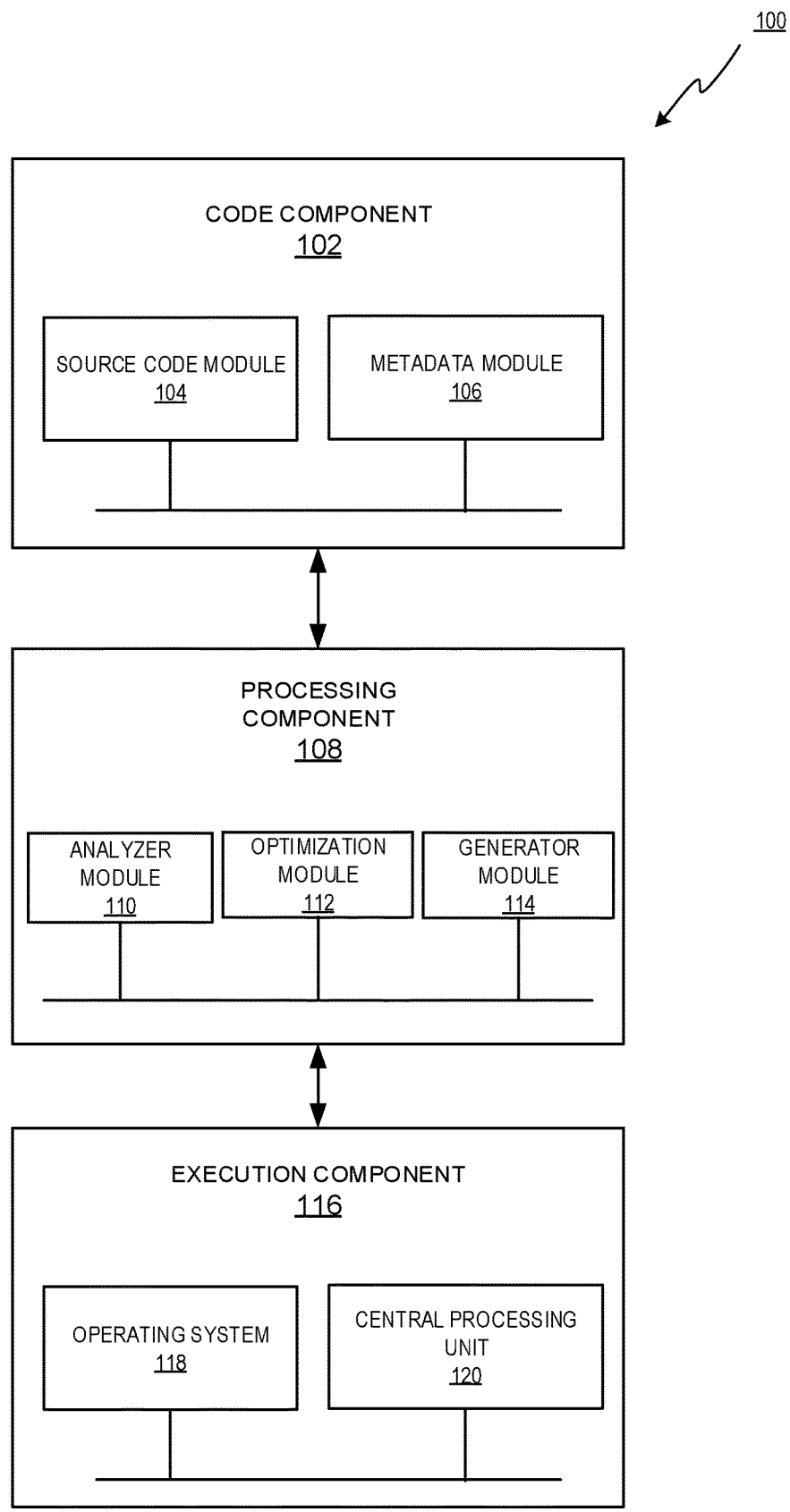
FIG. 1 depicts a block diagram of an example computing system that enables code to be processed, in accordance with one or more aspects of the present disclosure.

To achieve wide adoption, source code is often written in a general way that allows for its use in different situations ("source code" may refer to a text listing of commands to be compiled into an executable computer program). For example, source code may be written in a generic way to accommodate different hardware, network protocols, file systems, classes of users, etc. However, this generalization of the codebase may also mean that its use for a specific purpose runs slower and requires more resources than a dedicated solution due to the additional code needed to account for all the unused variants and the runtime tests to determine which is the right variant to use.

Aspects of the present disclosure address the above deficiencies by providing methods that give a compiler information about run-time values of one or more variables in the code being compiled, such that the information facilitates determining the outcome of evaluating one or more conditional expressions contained by the code without compromising the goal to have generalized source code. This information allows the compiler to perform optimizations (e.g., dead code elimination, code injection, value range propagation) based on information that would not be compile-time constant without the method described in this disclosure.

Conditional expressions are the features of a programming language that allow performing different computations or actions depending on whether a Boolean condition evaluates to true or false. Conditional expressions may be used in runtime code and preprocessor directives. A preprocessor conditional compilation directive (preprocessor conditional expression) may instruct the preprocessor to select whether or not to include a section of code in a final token stream passed to the compiler. A programming language, such as C, may test arithmetic expressions, or whether a name is defined as a macro, or both simultaneously using the special defined operator. A preprocessor conditional compilation directive in the C preprocessor resembles in some ways an "if" statement in C, although the two are different. If the "if" statement cannot be removed through dead code elimination or another optimization, the condition in the "if" statement is tested during the execution of the program. The condition in a preprocessing conditional directive is tested when the program is compiled. Its purpose is to allow different code to be included in the program depending on the situation at the time of compilation. However, some compilers may resolve "if" statements when a program is compiled, if their conditions are known not to vary at run time, and eliminate code which may never be executed.

There are several reasons to use a preprocessor conditional compilation directive. A program may need to use different code depending on the machine or operating system it is to run on. In some cases, the code for one operating system may be erroneous on another operating system. For example, the code may refer to data types or constants that do not exist on the other system. The invalid code's mere presence may cause the compiler to reject the program. With a preprocessing conditional expression, the offending code may be effectively excised from the program when it is not valid.

A preprocessor conditional compilation directive allows the compiler to compile the mostly same source code into two different programs. One version may make frequent time-consuming consistency checks on its intermediate data, or print the values of the data for debugging, and the other may not. A preprocessor conditional compilation directive with a condition that is always false is one way to exclude code from the program but keep it as a comment for future reference. Accordingly, programs that have system-specific logic or complex debugging hooks may benefit from pre-processing conditionals expressions.

Preprocessor directives may be lines included in the code of programs. These lines are not program statements but directives for the preprocessor. The preprocessor examines the code before actual compilation of code begins and resolves all these directives before any code is actually generated by regular statements.

Preprocessor directives, such as #define and #ifdef, are typically used to make source programs easier to change and easier to compile in different execution environments. Directives in the source code tell the preprocessor to perform specific actions. For example, the preprocessor may replace tokens in the text, insert the contents of other files into the source code, or suppress compilation of part of the file by removing sections of text. Preprocessor lines may be recognized and carried out before macro expansion. Therefore, if a macro expands into something that looks like a preprocessor command, that command may not recognized by the preprocessor. In each programming language, the details to achieve similar results may be different. For example, in C++ 'if constexpr' may be used in conjunction with templates. In Common LISP, a macro system may be part of the language and may be used to completely rewrite the input text if desired.

The present disclosure is directed to the benefits of making compile-time decisions instead of run-time decisions. Preprocessor directives and similar methods to control code generation at compile-time may be invasive to the source code because combining the conditions to control preprocessors quickly becomes cumbersome since the expressions after #if have to be extended appropriately throughout the source code to handle all possible combination of selections at the same time.

One method of the present disclosure involves injecting configuration options throughout the code. Selecting a specific subset of the code to compile may then allow for building a specific version of the source code, or software, which has all the unneeded variants stripped out. In this method, the configuration options (e.g., assumptions related to run-time values of one or more variables) may be inserted and code optimizations (e.g., dead code elimination) cause the dead code not to be compiled.

Another method is to explicitly omit or circumvent the unneeded code fragments using preprocessor directives and conditional inclusion statements. In yet another method, a range of instructions are marked with a conditional statement (e.g., "if-else" expression) and a branch of the conditional statement is marked as unreachable by one or more code optimizations.

Using the techniques of the present disclosure, it is possible to customize large codebases without disturbing other users of the sources. This is useful, for instance, in creating special OS kernels for specific containers or uni-kernel deployments ("kernel" refers to a computer program that is the core of a computer's operating system, with complete control over everything in the system; "unikernel" refers to a specialized, single address space machine image constructed by using library operating systems).

FIG. 1 depicts a block diagram of an example computing system that enables a processing component to receive information about values of one or more variables in specific places in the code being compiled, such that the information facilitates determining the outcome of expression evaluation. This information allows the compiler to efficiently perform dead code elimination (DCE) or other optimizations reducing the amount of generated code, thus improving the efficiency and the memory footprint of the generated code. For example, this information may be provided by metadata that allows the compiler to determine an outcome (true or false) of an expression, and thus allow the compiler to apply dead code elimination or other optimization techniques in order to remove the tests and code fragments that would only be executed if the outcome of evaluating the conditional expression was different from the outcome that has been determined based on the available metadata.

Computing system 100 may be a single computing machine or multiple computing machines arranged in a homogeneous or heterogeneous group (e.g., cluster, grid, server farm). Computing system 100 may include one or more rack mounted servers, workstations, desktop computers, notebook computers, tablet computers, mobile phones, palm-sized computing devices, personal digital assistants (PDAs), etc. In one example, computing system 100 may be a computing device implemented with x86 hardware. In another example, computing system 100 may be a computing device implemented with PowerPC®, SPARC®, other hardware, or a combination thereof. In either example, computing system 100 may include one or more hardware resources. It should be noted that other architectures for computing system 100 are possible, and that the implementations of the computing system utilizing embodiments of the disclosure are not necessarily limited to the specific architecture depicted.

Computing system 100 may implement a code component 102, processing component 108, and execution component 116. The code component 102 may be responsible for furnishing code for further processing and compiling. The source code module 104 may produce the source code text. The source code may be imported from another process running on the same or separate computing system, or may be received via a graphical user interface (GUI). The metadata module 106 may provide additional information regarding one or more functions, function calls, variables, statements, or expression evaluation outcomes. The metadata may be entered in various ways, including being imported via a GUI or via a configuration file.

The processing component 108 may receive the source code and the metadata. The processing component 108 may comprise at least one preprocessor, compiler, interpreter, assembler, computer device, computer program or any combination of the aforementioned. Some examples in this disclosure may treat the processing component 108 as a compiler. The compiler may translate computer source code written in one programming language (the source language) into another programming language (the target language). The compiler may process or compile the source code and produce an object file. One or more object files may be combined with predefined libraries by a linker to produce a final complete file that may be executed by a computer. A library may refer to a collection of pre-compiled object code that provides operations that are done repeatedly by computer programs.

The compiler may perform any combination of the following operations: preprocessing, lexical analysis, parsing, semantic analysis (syntax-directed translation), conversion of input programs to an intermediate representation, code optimization, and code generation. The compiler may implement these operations in phases that promote efficient design and correct transformations of source input to target output.

The compiler may implement a formal transformation from a high-level source program to a low-level target program. Compiler design may define an end to end solution or tackle a defined subset that interfaces with other compilation tools e.g. preprocessors, assemblers, linkers. Design requirements may include clearly defined interfaces both internally between compiler components and externally between supporting toolsets.

A compiler for a relatively simple language written by one person may be a single, monolithic piece of software. However, the compiler design may be split into a number of interdependent phases. Separate phases may provide design improvements that focus development on the functions in the compilation process.

The analyzer module 110 may perform scanning and parsing of the source code and the associated metadata. The scanning may include converting a sequence of characters in the source code into a sequence of tokens (strings with an assigned and thus identified meaning). The parsing may include converting the sequence of tokens into a parse tree, which is a data structure representing various language constructs: type declarations, variable declarations, function definitions, loops, conditionals, expressions, etc. The analyzer module 110 may include one or more preprocessors. The scanned and parsed source code may then be optimized. The optimization module 112 may configure, modify, or optimize the source code based on the metadata providing information about the source code. Such configurations or modifications may include adding annotations, markups, and preprocessor directives to the source code, or using macros to eliminate redundancies and simplify computations. The optimizer module 112 may transform an intermediate representation of the program with the same semantic as the input source code. Annotations may be used during the parsing and added to the internal representation at the time it is generated by the parser.

The optimization module 112 may perform compile-time function evaluation on the source code. Compile-time function evaluation is the ability of a compiler, which would normally compile a function to machine code and execute it at run time, to execute the function at compile time. This is possible if the arguments to the function are known at compile time.

The optimization module 112 may also perform dead code elimination (DCE). The dead code elimination may be performed on the front end, middle end, or back end of the processing component e.g., compiler. Dead code elimination is a technique for improving the efficiency of a program by eliminating certain fragments of code, which are known to never be executed under certain conditions (e.g., on a particular platform, for a particular input data set, etc.). Code may be classified as either completely or partially dead. Completely dead code may also refer to a section in the source code of a program which is executed with a result that is never used in any other computation e.g., statement for a return of the computed values. Partially dead code has its computed values used along some paths but not others. Dead code includes code that may never be executed (unreachable code) and code that only affects dead variables (written to, but never read again), which are presumably irrelevant to the results being computed.

Dead code may normally be considered dead unconditionally. Therefore, it is reasonable to use dead code elimination to remove dead code at compile time. However, it is also common for code sections to represent dead or unreachable code only under certain conditions, which may not be known at the time of compilation or assembly. Such conditions may be imposed by different runtime environments (for example different versions of an operating system, or different sets and combinations of drivers or services loaded in a particular target environment), which may require different sets of special cases in the code, but at the same time become conditionally dead code for the other cases.

Also, the software (for example, a driver or resident service) may be configurable to include or exclude certain features depending on the requirements of the created executable, rendering unused code portions unused in a particular scenario. The techniques used to dynamically detect demand, identify and resolve dependencies, remove such conditionally dead code, and to recombine the remaining code at load or runtime may be called dynamic dead code elimination or dynamic dead instruction elimination. The optimization module 112 may perform value range propagation. Value range propagation may be used where the value of a variable is not known or varies, but the possible range of values is known and is used to perform optimizations of the code.

The generator module 114 may compile the source code that is to be executed. In one example, due to the above-referenced optimizations, some parts of the source code may be marked for compilation (e.g., reachable, executable) and other parts of the source code marked as not to be compiled (e.g., unreachable, nonexecutable). In another example, the generator module 114 may generate code for all the code represented in the intermediate format (e.g., static single assignment form) that is passed to it. The optimizations may be implemented by changing the internal representation (e.g., an endomorphic function). If DCE is applied to the code, a part of the internal representation may be removed before the internal representation is passed to the generator module 114 for code generation.

The execution component 116 is an optional component in computer system 100 (e.g., the compiled source code may be executed by a different computer system). The execution component 116 may execute the compiled source code. The operating system 118 may manage the computer's resources—its central processing unit (CPU) 120, primary storage, and input/output devices—so that the resources may be correctly and fairly used by one or more persons and/or computer programs. The operating system 118 may enable the central processing unit 120 to read the machine code of the compiled source code.

Figure 2:
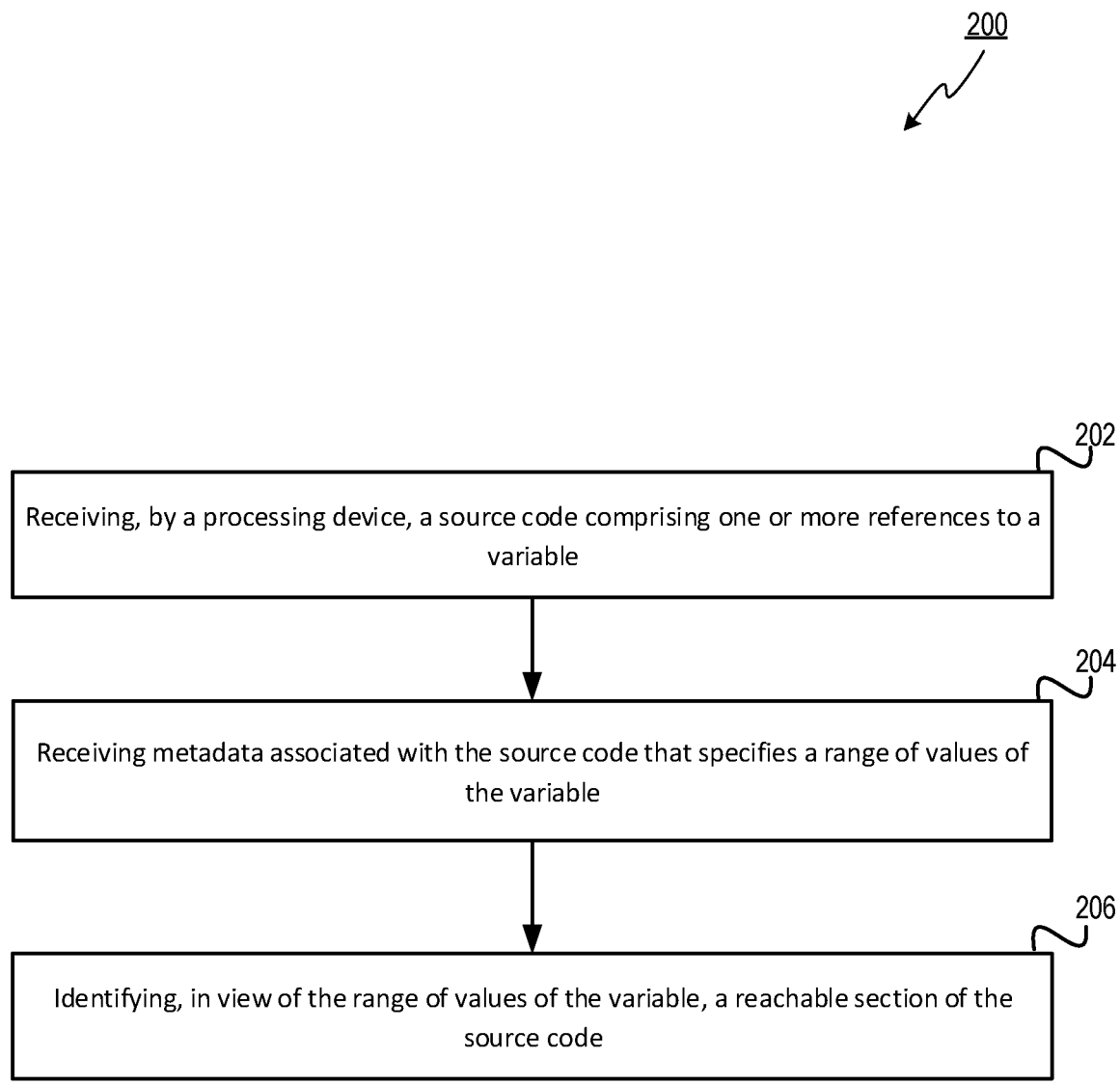
FIG. 2 depicts a flow diagram illustrating an example method for handling code, in accordance with one or more aspects of the present disclosure.

FIG. 2 depicts a flow diagram 200 illustrating an example method for handling code, in accordance with one or more aspects of the present disclosure. At block 202, the processing component 108 implementing the method may receive a source code comprising one or more references to a variable. The source code may be received by via direct input from a programmer or upload from another computer program. The variable may be referenced by one or more conditional expressions within the source code. Notably, the operations described herein with respect to a single variable, may similarly be performed to multiple variables.

At block 204, the processing component implementing the method may receive metadata associated with the source code that specifies a range of values of the variable, at a specific location in the source code, and thus determines the outcome of an expression evaluation. The metadata may be provided by any combination of one or more markups, annotations, preprocessor directives, or configuration files. A configuration file may include supplementary information to configure values for variables, compiler parameters, and/or initial settings of the source code or computer program.

The metadata may be received separately or within the source code file. For example, assume the following source code:

```
a = f(b);
if (a < 10)
    return g(a);
return a + 10;
```

The configuration file could contain the following:

```
@@ -1,4 +1,5 @@
  a = f(b);
+#pragma assume (a == 3 || == 5)
  if (a < 10)
    return g(a);
  return a + 10;
```

The format (e.g., a patch) in the above example, provides context to where the injection of the assumption is to take place. The #pragma syntax may be different in other examples.

One of the benefits of this technique is that the same source code with different configuration files may generate differently optimized compiled code. The metadata may determine an outcome of an expression evaluation, using for example compile-time function evaluation (compile-time evaluation). In the examples where dead code elimination is used, dead code elimination may be used to remove comparison tests that will always fail or succeed. Removing dead code saves resources by not compiling code that does not affect the results of the program. Eliminating dead code minimizes the time taken to execute a program and the amount of memory occupied.

At block 206, the processing component 108 implementing the method may identify, based on the metadata-specified range of values of the variable, one or more reachable sections of the source code using, for example, compile-time evaluation. The processing component 108 may determine that a section of the source code would be reachable if the value of the variable falls within the range specified by the metadata. The processing component 108 may also identify one or more unreachable sections of the code using, for example, compile-time evaluation. The processing component 108 may determine that a section of the source code would be unreachable if the value of the variable falls outside the range specified by the metadata. Value range propagation may be used to propagate the range of values of the variable throughout the source code. Then compile-time evaluation may be used to determine the result of evaluating conditional statements in the source code (e.g., if/then statements) based on the metadata-specified range of values. Sections of code deemed unreachable may be excised using dead code elimination. The generator module 114 of the processing component 108 may compile the reachable section of the source code and circumvent compiling of the unreachable section of the source code. The above-described operations may be implemented by a compiler with or without a compiler plugin.

FIG. 3A depicts a diagram of an example block of code, in accordance with one or more aspects of the present disclosure. In source code 300, two functions are used to handle different types of messages. The actual type is not known until runtime, and thus the compiler would not be able to determine the value of the variable "type," which is used in the sequence of conditional expressions that determine which code block is executed. The syntax used in source code 300 is similar to C/C++.

In source code 300, preprocessor directives 302 (e.g., #if, #endif, #elif, etc.) are used to control the generated code by explicitly disabling the compiler from seeing certain portions of the code. In the handle_message function 303, preprocessor directive 302 is used to control whether test 304 is compiled. However, in order to allow efficient dead code elimination, the preprocessor directives should often match the run-time tests. For example, if the code is supposed to handle messages of type 1 (as indicated by the macro HANDLE_TYPE_1 302) then test 304 is performed at runtime. If the code is supposed to handle messages of type 3 (as indicated by the macro HANDLE_TYPE_3 308) then test 312 is performed at runtime. But if the runtime tests change at any point, one will need to remember to adjust the preprocessor code as well. In other words, the preprocessor directives need to essentially track the run-time conditional expression, thus increasing the overall complexity of the code maintenance and making the optimization process more prone to error.

In another example 306, in order to allow efficient dead code elimination, the preprocessor directives should often match the run-time tests. If the code is supposed to handle messages of type 1 or type 4 (as indicated by the definition of macros HANDLE_TYPE_1 and HANDLE_TYPE_4) then the "type==TYPE_1||type==TYPE_4" test is performed at runtime. If in one case, the code is supposed to only handle messages of type 1, then only the type==TYPE_1 code is compiled and run. If the code is supposed to handle messages of type 2 (as indicated by the macro HANDLE_TYPE_2) then the "type==TYPE2" test is performed at runtime. The various HANDLE_TYPE_options may be defined concurrently and therefore code for any number of the subexpressions may be necessary. But if the runtime tests change at any point, one will need to remember to adjust the preprocessor code as well. In other words, the preprocessor directives need to essentially track the run-time conditional expression, thus increasing the overall complexity of the code maintenance. FIG. 3B depicts a more efficient method of optimization by a markup in the source code.

FIG. 3B depicts a diagram of an example block of marked up code, in accordance with one or more aspects of the present disclosure. In source code 301, the pragma directive 310 is used, but other forms of markups, annotations, and notes may also be used.

Pragma directives may specify machine-specific or operating-specific compiler features. For instance, each implementation of C and C++ may support some features unique to its host machine or operating system. Some programs, for example, may exercise control over the memory areas where data is put or control the way certain functions receive parameters. The #pragma directives offer a way for each compiler to offer machine-specific and operating system-specific features while retaining overall compatibility with the programming languages.

Pragmas may be machine-specific or operating system-specific, and may be different for every compiler. Pragmas may be used in conditional statements, to provide new preprocessor functionality, or to provide implementation-defined information to the compiler. The compiler may allow a programmer to add expressions such as pragma expressions to the code. In the case where the compiler does not know how to handle the expressions, they may simply be ignored.

The information the pragma directive 310 conveys that the compiler may assume that the variable (var) "type" has a value corresponding to the tool-internal variable "messagetype." A tool-internal variable may refer to a compiler-internal variable. Alternatively, the tool may be a computer program that used to create, debug, maintain, or otherwise support other programs and applications. A tool may also refer to programs that may be combined together to accomplish a task e.g., a source code editor, compiler, interpreter, debugger, or profiler. Tools may be discrete programs, executed separately—often from the command line—or may be parts of a single large program e.g., an integrated development environment (IDE). In this case, the variable "messagetype" may be given a value as part of the configuration that the tool is given for the compilation. The information about the possible values (in this case about the variables "type") may be injected by the compiler into the code before the compiler starts other optimizations and code generation. A benefit of this approach is that the markups do not need to be updated if the source code changes.

Figure 4:
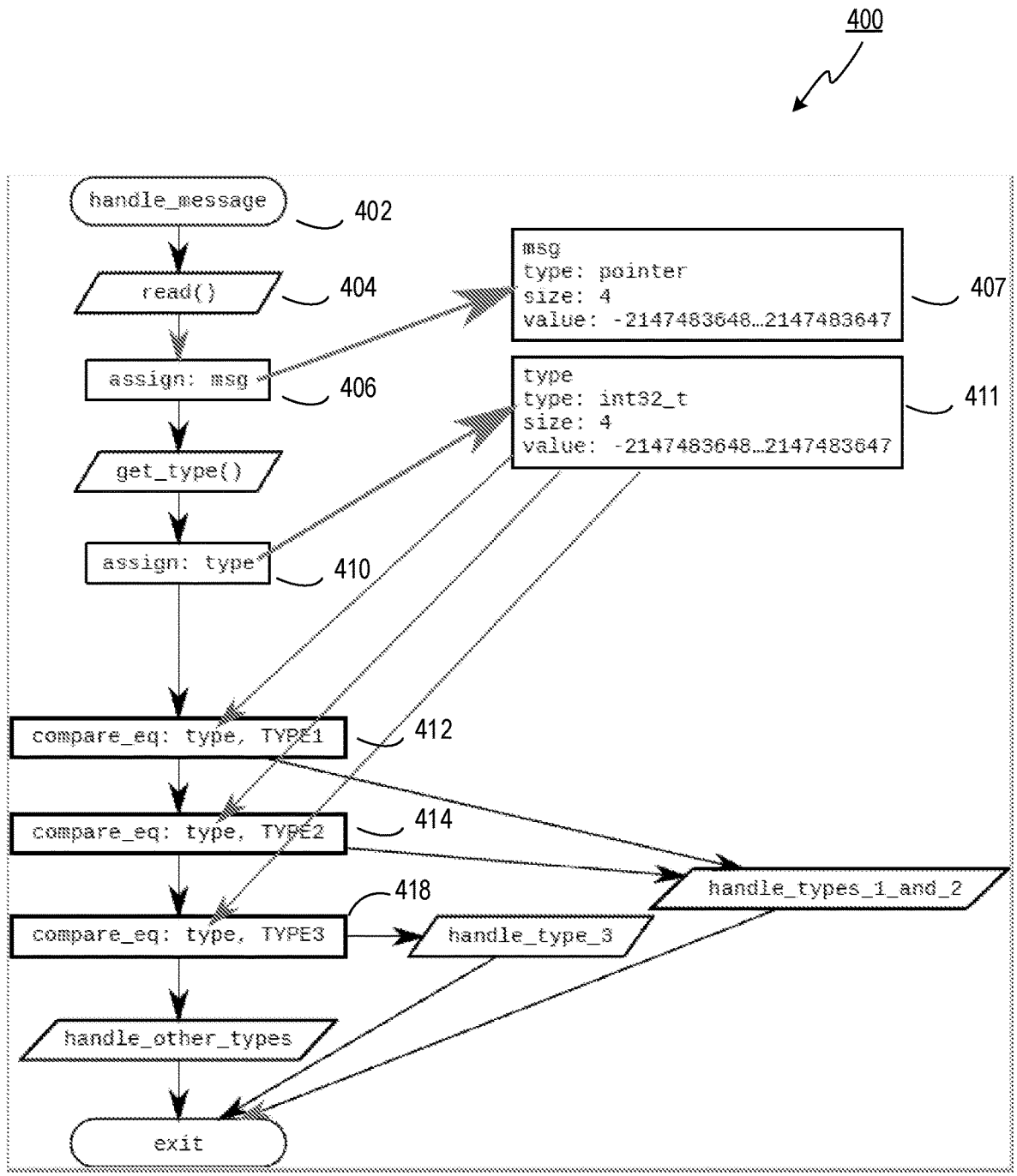
FIG. 4 depicts a flow diagram of an example code in accordance with one or more aspects of the present disclosure.

FIG. 4 depicts a flow diagram of an example code in accordance with one or more aspects of the present disclosure. More specifically, FIG. 4 depicts a possible abstract syntax tree (AST) 400 for the 'handle_message' function of FIG. 3A. The abstract syntax tree 400 shows the "handle_message" function 402, function call "read ( )" 404, and statements 406, 410 where a return value 407 of "msg" may be assigned to a variable "msg." The information 407 about the variable "msg" and the information 411 about the variable "type" may be gathered by the compiler but remain incomplete. The compiler does not know the exact value of the variables "msg" and "type" as the full range of a numbers of a 32-bit number is shown under the value section (−2147483648 . . . 2147483647). Accordingly, each compare test 412, 414, 418 is completed separately because none of the tests may be evaluated at compile-time. Compare test 412 sees whether the type corresponds TYPE1. Compare test 414 sees whether the type corresponds TYPE2. If the type corresponds to TYPE1 or TYPE2, then the handle_types_1_and_2 macro is applied. Compare test 418 sees whether the type corresponds TYPE3. If the type corresponds to TYPE3, then the handle_type_3 macro is applied. If the above tests fail, then the handle_other_types macro is applied.

Figure 5:
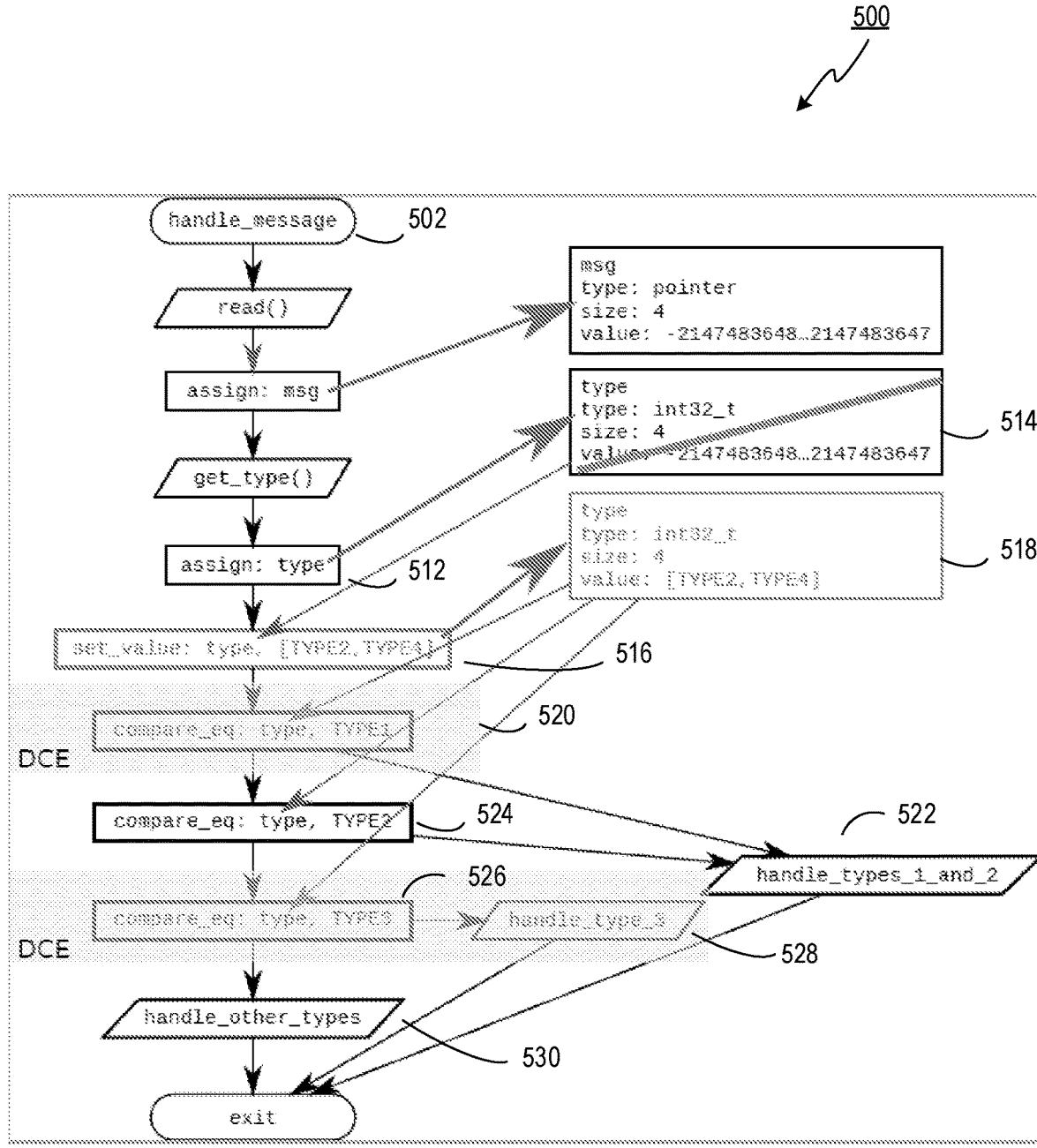
FIG. 5 depicts a flow diagram of an example configured code in accordance with one or more aspects of the present disclosure.

FIG. 5 depicts a flow diagram of an example configured code in accordance with one or more aspects of the present disclosure. The abstract syntax tree 500 is an example of the flow when #pragma statements from FIG. 3B, for example, are used. In this example, the #pragma statement informs the compiler through the internal variable "messagetype" that "type" 512 may have the values of TYPE2 or TYPE4 at node 516. At node 516, a new record 518 for the variable "type" may be created and an old record 514 may be replaced or deleted. Using value range propagation, the compiler may use the knowledge provided at node 516 in the remainder of the function 502. The compiler may determine that the TYPE_1 comparison test 520 will never be true and therefore cause the test 520 to be omitted from the compiling process using, for example, dead code elimination (DCE). Furthermore, the TYPE_3 comparison test 526 will also always fail and the test 526 may be omitted as well. And since the conditional branch after the TYPE_3 comparison test 526 is the only way to reach block "handle_type_3" 528, block "handle_type_3" 528 may be omitted, too. Omitting the above code may mean that the compiler does not compile the code, thus saving resources, processing time, and memory. In addition, any changes to the source code are minimal e.g., if additional TYPE comparison tests are added, they will be handled automatically. However, the TYPE_2 comparison test 524, block "handle_types_1_and_2" 522, and handle_other_types 530 may be compiled because the value of "type" is known to be either TYPE2 or TYPE4 (TYPE4 falling under other types).

When the result of a comparison test is determined to be always true or always false using compile-time evaluation, then dead code elimination may be used to remove any code that is unreachable or elements of comparison tests that will always fail or succeed (e.g., "then" blocks, "else" blocks). Removing dead code saves resources by not compiling code that does not affect the results of the program. Eliminating dead code minimizes the time taken to execute a program and the amount of memory occupied.

Specifying possible values of a variable is just one way the code may be optimized. In one embodiment of the disclosure, annotations similar to the following may be used:

```
#pragma assume if(somecondition:false)
if (foo(a) || bar(a, b))
``` which could mean that the test for the "if" is meant to be "false" in case the configuration option "somecondition" is set. In another embodiment of the disclosure, the compiler's optimization capabilities (e.g., value range propagation and dead code elimination) may perform configuration management e.g., code-rewrite. In yet other example, optimizing functionality may be implemented as a compiler frontend (parser) step. For instance, the parser could generate the following code based on the information provided at node 516:

```
if (type != TYPE_2 && type != TYPE_4)
    __builtin_unreachable( );
``` this gives the compiler exactly the same information e.g., "type" is TYPE_2 or TYPE_4. The parser may inject the appropriate information in the abstract syntax tree (AST).

Figure 6:
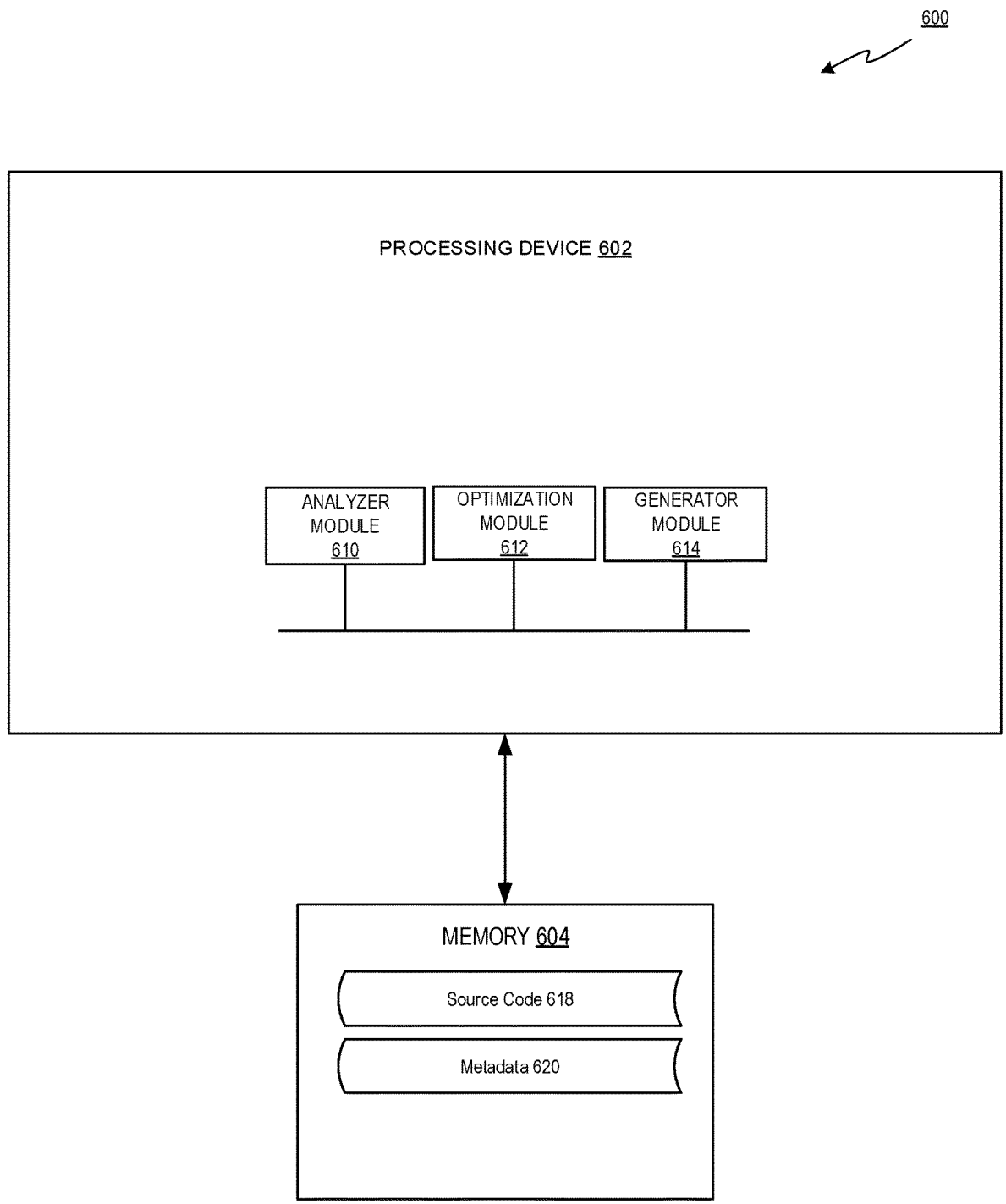
FIG. 6 depicts a block diagram of an illustrative system operating in accordance with the examples of the present disclosure.

FIG. 6 depicts a block diagram of an illustrative system operating in accordance with the examples of the present disclosure. Computer system 600 may be implement the example system 100 of FIG. 1 and may include one or more processing devices 602 and one or more memory devices 604. In the example shown, computer system 600 may implement a compiler comprising the analyzer module 610, the optimization module 612, and/or the generator module 614.

In particular, the analyzer module 610 may enable the processing device 604 to receive a source code for compilation. The source code may be received via a user interface, a network interface, or an inter-process communication channel. The source code may comprise one or more references to a variable, which may be utilized by one or more conditional expressions within the source code. Notably, the processing described herein with respect to a single variable may be similarly performed for two or more variables.

The analyzer module 610 may further enable the processing device 604 to receive metadata associated with the source code that specifies a range of values of the variable and thus determines the outcome of an expression evaluation. The metadata may be associated with one or more variables, and may be provided by any combination of one or more markups, annotations, preprocessor directives, or configuration files. A configuration file may include supplementary information specifying the values for variables, compiler parameters, and/or initial settings of the source code. In certain implementations, the metadata may be included within the source code file. The received source code 618 and metadata 620 may be stored in the memory 604.

The optimization module 612 may enable the processing device 604 to identify, in view of the range of values of the variable, one or more reachable section of the source code 610. The optimization module 612 may determine that a section of the source code would be reachable if the value of the variable falls within the range specified by the metadata. The optimization module 612 may further identify, in view of the range of values of the variable, an unreachable section of the source code. The optimization module 612 may determine that a section of the source code would be unreachable if the value of the variable falls outside the range specified by the metadata.

After the range of values of the variable are propagated throughout the code and compile-time evaluation is performed to determine the outcome of statements dependent of the range of values of the variable, the optimization module 612 may apply the dead code elimination technique to circumvent compiling dead code. Dead code elimination may involve removing, from the scope of compilation, one or more code fragments corresponding to outcome of comparison tests that would always fail. Dead code elimination minimizes both compile time and run-time of the code, as well as the amount of memory occupied by the executable code. As noted herein above, the above-described optimization may be performed based on metadata for one or more variables.

Thus, the generator module 614 may enable the processing device 604 to compile one or more reachable sections of the source code and circumvent compiling of one or more unreachable sections of the source code.

Figure 7:
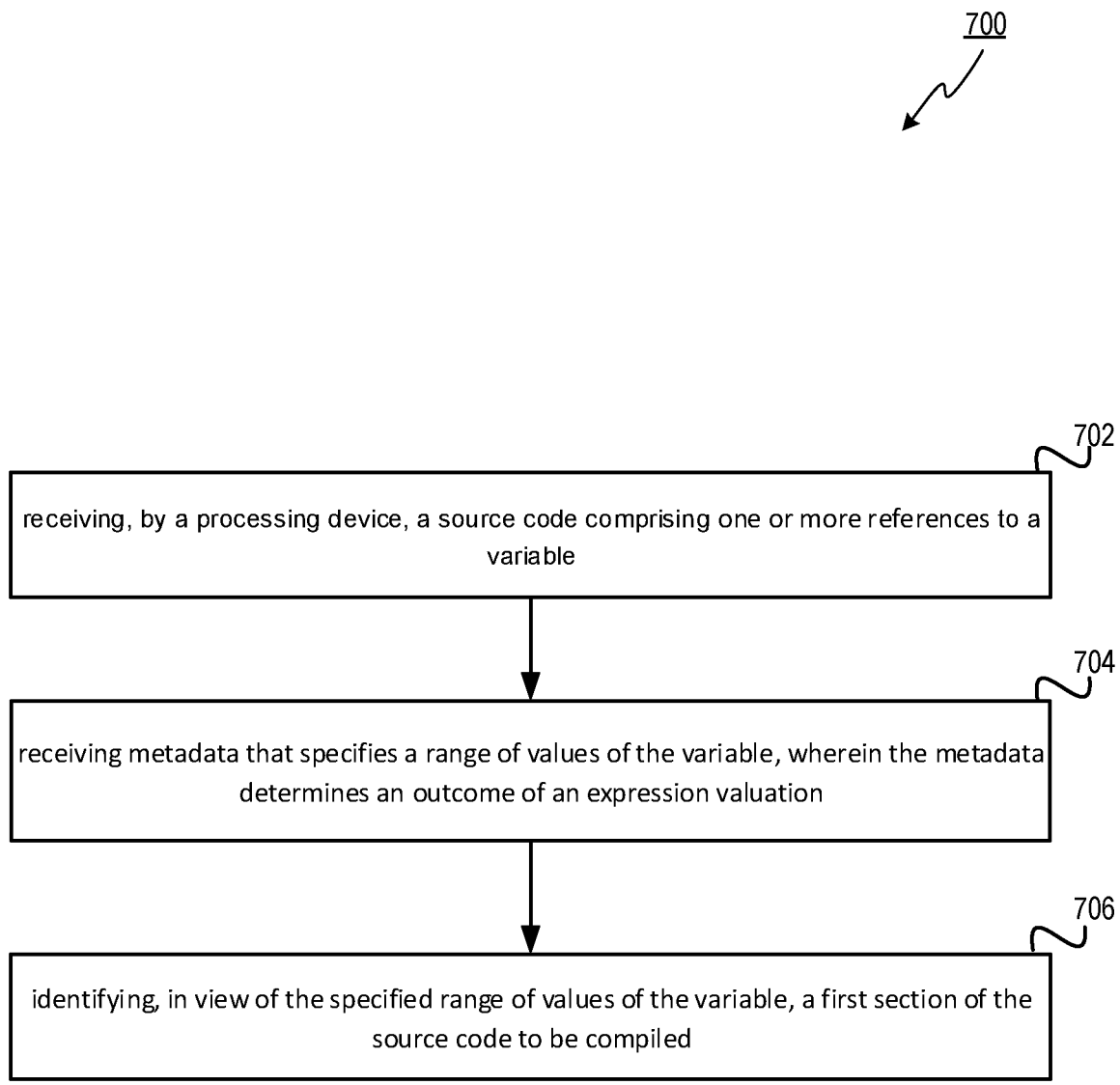
FIG. 7 depicts a flow diagram illustrating an example method of processing source code, in accordance with one or more aspects of the present disclosure.

FIG. 7 depicts a flow diagram illustrating an example method 700 of processing source code, in accordance with one or more aspects of the present disclosure. The method may be implemented, e.g., by a compiler or a compiler plugin, and may be performed using the computer system 100 of FIG. 1.

At block 702, the processing device implementing the method may receive a source code comprising one or more references to a variable. The source code may be received via a user interface, a network interface, or an inter-process communication channel. The variable may be referenced by one or more conditional expressions within the source code.

At block 704, the processing device may receive metadata that specifies one or more values (e.g., a plurality of discrete values or a range of values) of the variable, and thus may be used for determining the outcome of evaluating one or more logical expressions referencing the value. The metadata may be provided by any combination of one or more markups, annotations, preprocessor directives, or configuration files. A configuration file may include supplementary information to configure values for variables, compiler parameters, and/or initial settings of the source code or computer program. The metadata may be received separately or within the source code file.

At block 706, the processing device may identify, in view of the specified range of values of the variable, a section of the source code to be compiled. The processing device may identify the section of the source code to be compiled by determining that the section would be reachable if the value of the variable falls within the range specified by the metadata.

In certain implementations, the processing device may further identify, in view of the range of values of the variable, an unreachable section of the source code. The processing device may determine that a section of the source code would be unreachable if the value of the variable falls outside the range specified by the metadata. The method may further comprise compiling the reachable section of the source code while excluding the unreachable section of the source code from the scope of compilation.

Figure 8:
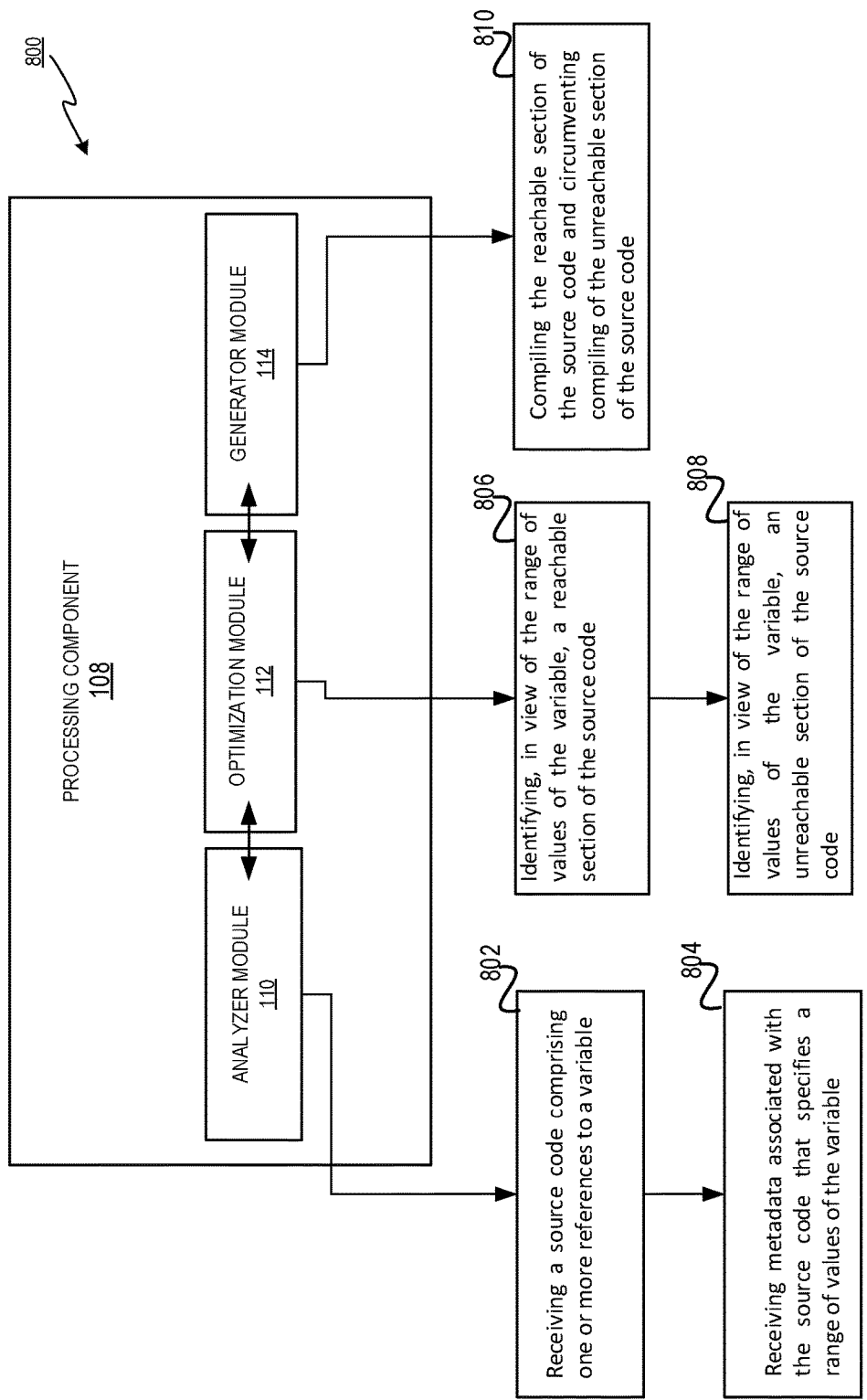
FIG. 8 depicts a block diagram of an illustrative device operating in accordance with the examples of the present disclosure.

FIG. 8 depicts a block diagram 800 of the processing component 108 operating in accordance with the examples of the present disclosure. At block 802, the analyzer module 110 may receive a source code comprising one or more references to a variable. At block 804, the analyzer module 110 may receive metadata that specifies a range of values of the variable, and thus determines an outcome of an expression evaluation. At block 806, the optimization module 112 may identify, in view of the range of values of the variable, a reachable section of the source code 806. The identification of the reachable section of source code may be performed using compile-time evaluation. The optimization module 112 may determine that a section of the source code would be reachable if the value of the variable falls within the range specified by the metadata. At block 808, the optimization module 112 may identify, in view of the range of values of the variable, an unreachable section of the source code. The identification of the unreachable section of source code may be performed using compile-time evaluation. The optimization module 112 may determine that a section of the source code would be unreachable if the value of the variable falls outside the range specified by the metadata. At block 810, the generator module 114 may compile the reachable section of the source code, while excluding the unreachable section from the scope of compilation. The processing component 108 may be represented by a compiler or a compiler plugin.

Figure 9:
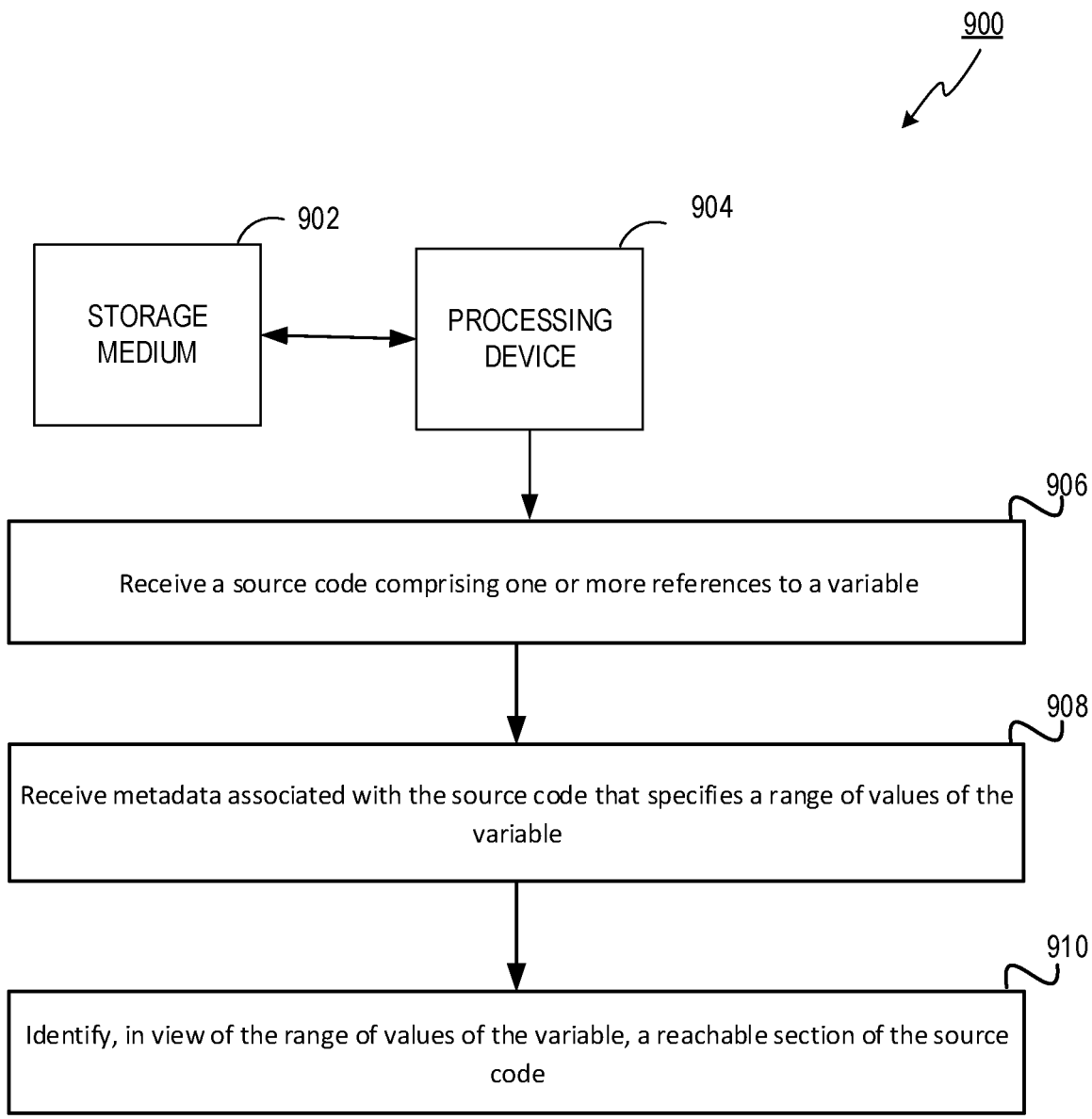
FIG. 9 depicts a block diagram of an illustrative method operating in accordance with the examples of the present disclosure.

FIG. 9 depicts a block diagram of an illustrative method 900 operating in accordance with the examples of the present disclosure. Storage medium 902 may be a non-transitory computer-readable storage medium storing instructions that, when executed, would cause the processing device 904 to perform certain operations. At block 906, the processing device 904 may receive a source code comprising one or more references to a variable. At block 908, the processing device 904 may receive metadata associated with the source code that specifies a range of values of the variable and thus determine the outcome of an expression evaluation. The metadata may be provided by a markup in the source code and/or a configuration file. At block 910, the processing device 904 may identify, in view of the range of values of the variable, a reachable section of the source code using, for example, compile-time evaluation. The processing device 904 may determine that a section of the source code would be reachable if the value of the variable falls within the range specified by the metadata. The processing device 904 may further identify, in view of the range of values of the variable, an unreachable section of the source code using, for example, compile-time evaluation. The processing device 904 may determine that a section of the source code would be unreachable if the value of the variable falls outside the range specified by the metadata. The processing device 904 may further compile the reachable section of the source code and circumvent compiling of the unreachable section of the source code using, for example, dead code evaluation.

According to some embodiments of the present disclosure, a compiler may include any combination of the following functionalities. For example, the compiler may be a one-pass or multi-pass compiler. Compiling involves performing lots of work and some computers do not have enough memory to contain one program that does all of this work. So compilers may be split up into smaller programs which each make a pass over the source (or some representation of it) performing some of the required analysis and translations.

The compiler may operate in several stages, including a front end, a middle end, and a back end. This is known as three-stage compiler structure.

The front end verifies syntax and semantics according to a specific source language. For statically typed languages, it performs type checking by collecting type information. If the input program is syntactically incorrect or has a type error, it may generate errors and warnings, highlighting them on the source code. Aspects of the front end include lexical analysis, syntax analysis, and semantic analysis. The front end transforms the input program into an intermediate representation (IR) for further processing by the middle end. This IR is usually a lower-level representation of the program with respect to the source code.

The middle end may perform optimizations on the IR that are independent of the CPU architecture being targeted. This source code/machine code independence is intended to enable generic optimizations to be shared between versions of the compiler supporting different languages and target processors. Examples of middle end optimizations are removal of useless (dead code elimination) or unreachable code (reachability analysis), discovery and propagation of constant values (constant propagation), relocation of computation to a less frequently executed place (e.g., out of a loop), or specialization of computation based on the context. Eventually producing the "optimized" IR that is used by the back end.

The back end takes the optimized IR from the middle end. It may perform more analysis, transformations and optimizations that are specific for the target CPU architecture. The back end generates the target-dependent assembly code, performing register allocation in the process. The back end performs instruction scheduling, which re-orders instructions to keep parallel execution units busy by filling delay slots. Although most algorithms for optimization are NP-hard (non-deterministic polynomial-time hardness), heuristic techniques may be implemented in production-quality compilers. Typically the output of a back end is machine code specialized for a particular processor and operating system.

This front/middle/back-end approach makes it possible to combine front ends for different languages with back ends for different CPUs while sharing the optimizations of the middle end. Practical examples of this approach are the GNU Compiler Collection, LLVM, and the Amsterdam Compiler Kit, which have multiple front-ends, shared optimizations and multiple back-ends.

The front end analyzes the source code to build an internal representation of the program, called the intermediate representation (IR). It also manages the symbol table, a data structure mapping each symbol in the source code to associated information such as location, type and scope.

While the frontend may be a single monolithic function or program, as in a scannerless parser, it may be implemented and analyzed as several phases, which may execute sequentially or concurrently. This method may be beneficial due to its modularity and separation of concerns. The frontend may be broken into three phases: lexical analysis (also known as lexing), syntax analysis (also known as scanning or parsing), and semantic analysis. Lexing and parsing may comprise the syntactic analysis (word syntax and phrase syntax, respectively), and in some cases these modules (the lexer and parser) may be automatically generated from a grammar for the language, though in more complex cases these require manual modification. The lexical grammar and phrase grammar may be context-free grammars, which simplifies analysis significantly, with context-sensitivity handled at the semantic analysis phase. The semantic analysis phase may be more complex and written by hand, but may be partially or fully automated using attribute grammars. These phases themselves may be further broken down: lexing as scanning and evaluating, and parsing as building a concrete syntax tree (CST, parse tree) and then transforming it into an abstract syntax tree (AST, syntax tree). In some cases additional phases are used, notably line reconstruction and preprocessing. During parsing, the input code may be matched against the metadata data and additional information, as disclosed above, may be emitted into the intermediate representation which helps the optimizer.

The main phases of the front end include the following:

Line reconstruction converts the input character sequence to a canonical form ready for the parser. Languages which strop their keywords or allow arbitrary spaces within identifiers may require this phase. Top-down, recursive-descent, table-driven parsers typically read the source one character at a time and do not require a separate tokenizing phase. Atlas Autocode and Imp (and some implementations of ALGOL and Coral 66) are examples of stropped languages whose compilers would have a Line Reconstruction phase.

Preprocessing supports macro substitution and conditional compilation. Typically the preprocessing phase occurs before syntactic or semantic analysis; e.g. in the case of C, the preprocessor manipulates lexical tokens rather than syntactic forms. However, some languages such as Scheme support macro substitutions based on syntactic forms.

Lexical analysis (also known as lexing or tokenization) breaks the source code text into a sequence of small pieces called lexical tokens. This phase may be divided into two stages: the scanning, which segments the input text into syntactic units called lexemes and assigns them a category; and the evaluating, which converts lexemes into a processed value. A token may be a pair consisting of a token name and an optional token value. Common token categories may include identifiers, keywords, separators, operators, literals and comments, although the set of token categories varies in different programming languages. The lexeme syntax is typically a regular language, so a finite state automaton constructed from a regular expression may be used to recognize it. The software doing lexical analysis may be called a lexical analyzer. This may not be a separate step—it may be combined with the parsing step in scannerless parsing, in which case parsing is done at the character level, not the token level.

Syntax analysis (also known as parsing) involves parsing the token sequence to identify the syntactic structure of the program. This phase typically builds a parse tree, which replaces the linear sequence of tokens with a tree structure built according to the rules of a formal grammar which define the language's syntax. The parse tree is often analyzed, augmented, and transformed by later phases in the compiler.

Semantic analysis adds semantic information to the parse tree and builds the symbol table. This phase performs semantic checks such as type checking (checking for type errors), or object binding (associating variable and function references with their definitions), or definite assignment (requiring all local variables to be initialized before use), rejecting incorrect programs or issuing warnings. Semantic analysis usually involves a complete parse tree, meaning that this phase logically follows the parsing phase, and logically precedes the code generation phase, though it is often possible to fold multiple phases into one pass over the code in a compiler implementation.

The middle end, also known as the optimizer, performs optimizations on the intermediate representation in order to improve the performance and the quality of the produced machine code. The middle end may contain those optimizations that are independent of the CPU architecture being targeted.

The main phases of the middle end include the following:

Analysis: This is the gathering of program information from the intermediate representation derived from the input. Data-flow analysis is used to build use-define chains, together with dependence analysis, alias analysis, pointer analysis, escape analysis, etc. Accurate analysis is the basis for any compiler optimization. The control flow graph of every compiled function and the call graph of the program are usually also built during the analysis phase.

Optimization: the intermediate language representation is transformed into functionally equivalent but faster (or smaller) forms. Some optimizations are inline expansion, dead code elimination, constant propagation, loop transformation and even automatic parallelization.

Compiler analysis is important for compiler optimization, and they tightly work together. For example, dependence analysis is important for loop transformation.

The scope of the present compiler analysis and optimizations may vary; it may range from operating within a basic block, to whole procedures, or even the whole program. There is a trade-off between the granularity of the optimizations and the cost of compilation. For example, peephole optimizations are fast to perform during compilation but only affect a small local fragment of the code, and may be performed independently of the context in which the code fragment appears. In contrast, interprocedural optimization may take more compilation time and memory space, but enable optimizations which are only possible by considering the behavior of multiple functions simultaneously.

Due to the extra time and space needed for compiler analysis and optimizations, some compilers, in accordance with the present disclosure, may skip them by default. Users may have to use compilation options to explicitly tell the compiler which optimizations should be enabled.

The back end is responsible for the CPU architecture specific optimizations and for code generation.

The main phases of the back end include the following:

Machine dependent optimizations: optimizations that depend on the details of the CPU architecture that the compiler targets. A prominent example is peephole optimizations, which rewrites short sequences of assembler instructions into more efficient instructions.

Code generation: the transformed intermediate language is translated into the output language, usually the native machine language of the system. This involves resource and storage decisions, such as deciding which variables to fit into registers and memory and the selection and scheduling of appropriate machine instructions along with their associated addressing modes. Debug data may also be generated to facilitate debugging.

Figure 10:
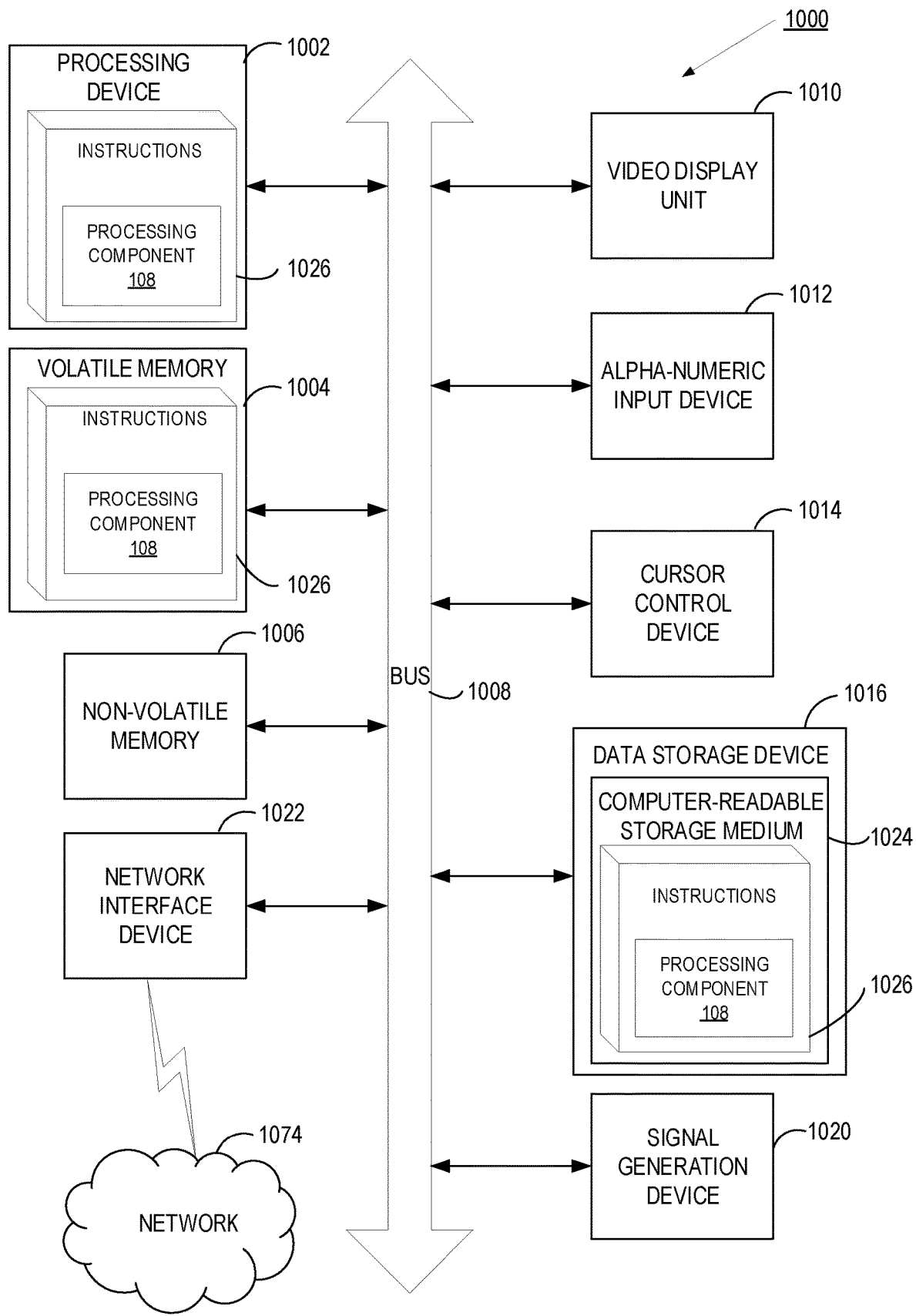
FIG. 10 depicts a block diagram of an illustrative computing device operating in accordance with the examples of the present disclosure.

FIG. 10 depicts a block diagram of a computer system operating in accordance with one or more aspects of the present disclosure. In various illustrative examples, computer system 1000 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 200, 700, 800, 900 and/or operations of processing component 108.

Instructions 1026 may also reside, completely or partially, within volatile memory 1004 and/or within processing device 1002 during execution thereof by computer system 1000, hence, volatile memory 1004, and processing device 1002 may also constitute computer-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of reachable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving, by a processing device, a source code comprising one or more references to a variable; receiving metadata associated with the source code, wherein the metadata specifies a range of values of the variable; and identifying, in view of the range of values of the variable, a reachable section of the source code.

Example 2 is the method of Example 1, further comprising: compiling the reachable section of the source code.

Example 3 is the method of Example 1, further comprising: identifying, in view of the range of values of the variable, an unreachable section of the source code; and excluding the unreachable section of the source code from the scope of compilation.

Example 4 is the method of Example 1, wherein identifying the reachable section of the source code further comprises: determining an outcome of a conditional expression referencing the variable.

Example 5 is the method of Example 1, wherein the metadata is provided by a markup in the source code.

Example 6 is the method of Example 1, wherein the metadata is provided by a preprocessor directive.

Example 7 is the method of Example 1, wherein the metadata is provided by a configuration file.

Example 8 is a system comprising a memory and a processing device operatively coupled to the memory. The processing device is configured to: receive a source code comprising one or more references to a variable; receive metadata associated with the source code, wherein the metadata specifies one or more values of the variable; and identify, in view of the one or more values of the variable, a reachable section of the source code.

Example 9 is the system of Example 8, wherein the processing device is further configured to compile the reachable section of the source code.

Example 10 is the system of Example 8, wherein the processing device is further configured to identify, in view of the one or more values of the variable, an unreachable section of the source code; and exclude the unreachable section of the source code from the scope of compilation.

Example 11 is the system of Example 8, wherein identifying the reachable section of the source code further comprises determining an outcome of a conditional expression referencing the variable.

Example 12 is the system of Example 8, wherein the metadata is provided by a markup in the source code.

Example 13 is the system of Example 8, wherein the metadata is provided by a preprocessor directive.

Example 14 is the system of Example 8, wherein the metadata is provided by a configuration file.

Example 15 is a non-transitory computer-readable storage medium comprising executable instructions that, when executed by a processing device, cause the processing device to: receive a source code comprising one or more references to a variable; receive metadata associated with the source code, wherein the metadata specifies a range of values of the variable; and identify, in view of the range of values of the variable, a reachable section of the source code.

Example 16 is the non-transitory computer-readable storage medium of Example 15, further comprising executable instructions that, when executed by the processing device, cause the processing device to compile the reachable section of the source code.

Example 17 is the non-transitory computer-readable storage medium of Example 15, further comprising executable instructions that, when executed by the processing device, cause the processing device to: identify, in view of the range of values of the variable, an unreachable section of the source code; and exclude the unreachable section of the source code from the scope of compilation.

Example 18 is the non-transitory computer-readable storage medium of Example 15, wherein identifying the reachable section of the source code further comprises determining an outcome of a conditional expression referencing the variable.

Example 19 is the non-transitory computer-readable storage medium of Example 15, wherein the metadata is provided by a preprocessor directive.

Example 20 is the non-transitory computer-readable storage medium of Example 15, wherein the metadata is provided by a configuration file.

Example 21 is a processing system comprising: a means for receiving a source code comprising one or more references to a variable; a means for receiving metadata associated with the source code, wherein the metadata specifies a range of values of the variable; and a means for identifying, in view of the range of values of the variable, a reachable section of the source code.

Example 22 is the processing system of the Example 21, further comprising: a means for compiling the reachable section of the source code.

Example 23 is the processing system of the Example 21, further comprising: a means for identifying, in view of the range of values of the variable, an unreachable section of the source code; and a means for excluding the unreachable section of the source code from the scope of compilation.

Example 24 is the processing system of the Example 21, wherein identifying the reachable section of the source code further comprises: determining an outcome of a conditional expression referencing the variable.

Example 25 is the processing system of the Example 21, wherein the metadata is provided by a markup in the source code.

Example 26 is the processing system of the Example 21, wherein the metadata is provided by a preprocessor directive.

Example 27 is the processing system of the Example 21, wherein the metadata is provided by a configuration file.

Example 28 is a method, comprising: receiving, by a processing device, a source code comprising one or more references to a variable; receiving metadata associated with the source code, wherein the metadata specifies one or more values of the variable; identifying, in view of the one or more values of the variable, an outcome of evaluating a conditional expression referencing the variable; and identifying, in view of the outcome of evaluating the conditional expression, a reachable section of the source code.

Example 29 is the method of Example 28, wherein the one or more values of the variable are represented by a range of the values of the variable.

Example 30 is the method of Example 28, further comprising: compiling the reachable section of the source code.

Example 31 is the method of Example 28, further comprising: identifying, in view of the outcome of evaluating the conditional expression, an unreachable section of the source code; and excluding the unreachable section of the source code from the scope of compilation.

Example 32 is the method of Example 1, wherein the metadata is provided by a markup in the source code.

Example 32 is the method of Example 1, wherein the metadata is provided by a preprocessor directive.

Example 34 is the method of Example 1, wherein the metadata is provided by a configuration file.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 700, 800 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a source code comprising one or more references to a run-time variable;
   receiving metadata that specifies a range of run-time values of the run-time variable at a specific location in the source code;
   identifying, at compile time, an unreachable section of the source code, wherein the unreachable section is defined by a comparison operation that fails based on a plurality of discrete run-time values of the run-time variable; and
   excluding the unreachable section from a compilation scope of the source code.

2. The method of claim 1, further comprising:
   identifying, at compile time, a reachable section of the source code; and
   compiling the reachable section of the source code.

3. The method of claim 1, wherein the metadata is provided by a markup in the source code.

4. The method of claim 1, wherein the metadata is provided by a preprocessor directive.

5. The method of claim 1, wherein the metadata is provided by a configuration file.

6. The method of claim 1, further comprising:
   compiling the source code into an object code.

7. The method of claim 1, wherein the metadata is provided by a configuration of an integrated development environment (IDE).

8. A system comprising:
   a memory;
   a processing device operatively coupled to the memory, the processing device to:
   receive a source code comprising one or more references to a run-time variable;
   receive metadata that specifies a range of run-time values of the run-time variable at a specific location in the source code;
   identify, at compile time, an unreachable section of the source code, wherein the unreachable section is defined by a comparison operation that fails based on a plurality of discrete run-time values of the run-time variable; and
   exclude the unreachable section from a compilation scope of the source code.

9. The system of claim 8, wherein the processing device is further to:
   identify, at compile time, a reachable section of the source code; and
   compile the reachable section of the source code.

10. The system of claim 8, wherein the metadata is provided by a markup in the source code.

11. The system of claim 8, wherein the metadata is provided by a preprocessor directive.

12. The system of claim 8, wherein the metadata is provided by a configuration file.

13. The system of claim 8, wherein the processing device is further to:
    compile the source code into an object code.

14. The system of claim 8, wherein the metadata is provided by a configuration of an integrated development environment (IDE).

15. A non-transitory computer-readable storage medium comprising executable instructions that, when executed by a processing device, cause the processing device to:
    receive a source code comprising one or more references to a run-time variable;

receive metadata that specifies a range of run-time values of the run-time variable at a specific location in the source code;

identify, at compile time, an unreachable section of the source code, wherein the unreachable section is defined by a comparison operation that fails based on a plurality of discrete run-time values of the run-time variable; and exclude the unreachable section from a compilation scope of the source code.

16. The non-transitory computer-readable storage medium of claim 15, wherein the metadata is provided by a markup in the source code.

17. The non-transitory computer-readable storage medium of claim 15, wherein the metadata is provided by a preprocessor directive.

18. The non-transitory computer-readable storage medium of claim 15, wherein the metadata is provided by a configuration file.

19. The non-transitory computer-readable storage medium of claim 15, further comprising executable instructions that, when executed by the processing device, cause the processing device to:

compile the source code into an object code.

20. The non-transitory computer-readable storage medium of claim 15, wherein the metadata is provided by a configuration of an integrated development environment (IDE).

* * * * *